US008063169B2

(12) United States Patent
Williamson et al.

(10) Patent No.: US 8,063,169 B2
(45) Date of Patent: Nov. 22, 2011

(54) PREPARATION OF POLYAMIDE BLOCK COPOLYMERS

(75) Inventors: David T. Williamson, Katy, TX (US); Wilson Tam, Boothwyn, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 705 days.

(21) Appl. No.: 11/756,045

(22) Filed: May 31, 2007

(65) Prior Publication Data

US 2007/0293629 A1 Dec. 20, 2007

Related U.S. Application Data

(60) Provisional application No. 60/809,534, filed on May 31, 2006.

(51) Int. Cl.
*C08G 63/02* (2006.01)

(52) U.S. Cl. ........ 528/272; 525/420; 525/438; 525/540; 525/92 B; 528/310

(58) Field of Classification Search .............. 525/92, 525/420, 438, 540; 528/310, 272
See application file for complete search history.

(56) References Cited

U.S. PATENT DOCUMENTS

| | | | | |
|---|---|---|---|---|
| 4,525,578 A * | 6/1985 | Wu et al. | ............ | 528/354 |
| 4,595,746 A | 6/1986 | Gabbert et al. | | |
| 5,030,698 A * | 7/1991 | Mulhaupt et al. | ............ | 525/423 |
| 5,039,783 A | 8/1991 | Brunelle et al. | | |
| 5,231,161 A | 7/1993 | Brunelle et al. | | |
| 5,407,984 A | 4/1995 | Brunelle et al. | | |
| 5,668,186 A | 9/1997 | Brunelle et al. | | |
| 5,703,177 A * | 12/1997 | Hoff | ............ | 525/411 |
| 6,414,103 B1 * | 7/2002 | Correll et al. | ............ | 528/25 |
| 2002/0188067 A1 | 12/2002 | White et al. | | |
| 2006/0096699 A1 | 5/2006 | Tam et al. | | |
| 2006/0100362 A1 | 5/2006 | Tam et al. | | |
| 2006/0100365 A1 | 5/2006 | Tam et al. | | |

FOREIGN PATENT DOCUMENTS

| | | |
|---|---|---|
| WO | WO 02/068496 A1 | 9/2002 |
| WO | WO 02/083766 A | 10/2002 |
| WO | WO 03/093491 A1 | 11/2003 |
| WO | WO 2006/053071 A | 5/2006 |
| WO | WO 2006/053075 A | 5/2006 |
| WO | WO 2006/053077 A | 5/2006 |
| WO | WO 2006/053078 A | 5/2006 |

OTHER PUBLICATIONS

U.S. Appl. No. 11/270,020, filed Nov. 9, 2005, Wilson Tam et al.
Souma et al., Crystallization of Poly (*ethylene terephthalate*) and Poly (*butylene terephihaiate*) Modified by Diamides, Polymer Engineering and Science, 2001, vol. 41:466-474.
Denchev et al., Sequential Reordering in Condensation Copolymers, 6 Average Block Lengths in Poly (*ethylene terephthalate*)—Polyamide 6 Copolymers as Revealed by NMR Spectroscopy, Macromol. Chem. Phys., 2001, vol. 202:574-586.
Samperi et al., Essential Role of Chain Ends in the Nylon-6/Poly-(ethylene terephthalate) Exchange, J. Polymer Sci., Part A: Polymer Chemistry, 2003, vol. 41:2778-2793.
Udipi et al., Polyamides From Lactams Via Anionic Ring-Opening Polymerization: 1. Chemistry and Some Recent Findings, Polymer, 1997, vol. 38:927-938.
Ahn et al., Compatibilizing Effect of Polyarylate-Nylon 6 Block Copolymers on Polyarlate/Nylon 6 Blends: 1. Synthesis of Polyarylate-Nylon 6 Block Copolymer and its Miscibility in Binary Blends With Polyarylate or Nylon 6, Polymer, 1993, vol. 34:4156-4165.
Mori et al., Reduction-Gas Chromatographic Determination of Cyclic Monomer and Oligomers in Polyamides, Analytical Chemistry, 1970, vol. 42:661-662.
Lavalette et al., Lipase-Catalyzed Synthesis of a Pure Macrocyclic Polyester From Dimethyl Terephthalate and Diethylene Glycol, Biomacromolecules, 2002, vol. 3:225-228.
Cetinkaya et al., XXIV *. Preparation and Characterization of Two Enetettramine-Derived Carbenerhodium (I) Chloride Complexes RhCl(L)3 and [RhCl(COD)LR](LR=dCN(Me)Cu(CH)4CNMe-o) and the Preparation and X-Ray Structures of the Enetetramine eR2 and its Salt [LR2][BF4]2, J. Organometallic Chemistry, 1994, vol. 481:89-96.
Teles et al., 7. The Chemistry of Stable Careenes, Benzoin-Type Condensations of Formaldehyde Catalyzed by Stable Carbenes, , , Helvetica Chimica Acta. 1996, vol. 79:61-83.
Niehues et al., Structural Characterization of Group 4 Transition Metal Halide Bis-Arduengo Carbene Complexes MC1L X-ray Crystal Structure Analyses and DFT Calculations, Organometallic Chem., 2002, vol. 663:192-203.
Herrmann et al., Heterocyclic Carbenes: A High-Yielding Synthesis of Novel, Functionalized N-Heterocyclic Carbenes in Liquid Ammonia, Chem. Eur. J., 2006, vol. 2:1627-1636.
Arduengo et al., Iimidazolylidenes, Imidazolinylidenes and Imidazolidines, Tetrahedron. 1999, vol. 55:14623-14534.
International Search Report, International Application No. PCT/US2007/012871, Dated Apr. 25, 2008.

* cited by examiner

*Primary Examiner* — James J Seidleck
*Assistant Examiner* — Gregory Listvoyb (57) ABSTRACT

This invention relates to the preparation of polyamide block copolymers by sequential monomer addition. More particularly, it relates to catalysts capable of copolymerizing not only cyclic amides, but other monomers such as cyclic esters and epoxides as well, using sequential addition so as to produce useful and novel block copolymers.

12 Claims, 2 Drawing Sheets

PREPARATION OF POLYAMIDE BLOCK COPOLYMERS

This application claims the benefit of U.S. Provisional Application No. 60/809,534, filed May 31, 2006, which is incorporated in its entirety as a part hereof for all purposes.

TECHNICAL FIELD

This invention relates to the preparation of polyamide block copolymers by sequential monomer addition. More particularly, it relates to catalysts capable of copolymerizing not only cyclic amides, but other monomers such as cyclic esters and epoxides as well, using sequential addition so as to produce useful and novel block copolymers.

BACKGROUND

Block copolymers are important components of materials for a variety of applications such as dispersants, crosslinkers, curing agents, resists, compatibilizers, inks, paints and surfactants. In particular, there is a wide range of potentially useful properties and applications for block copolymers of nylon 6 [see e.g. Bouma et al (*Polymer Engineering and Science*, March 2001, 41(3), 466-474].

Block copolymers of nylon 6 and poly(ethylene terephthalate) ("PET") can be made by amide-ester interchange reactions that occur when the two polymers are blended in the melt. However, this is not a useful, well-controlled process. As the interchange reactions continue, randomization takes place [see e.g. Denchev et al, *Macromol. Chem. Phys.*, 2001, 202(4), 574-586]. Also, the polymer chain ends play an important role in the amide-ester interchange. For example, when PET and nylon 6 are melt blended in the presence of a toluene sulfonic acid catalyst, a hydrolytic reaction of the PET occurs and produces PET chains with reactive carboxyl groups (Samperi et al, *J. Polymer Sci., Part A: Polymer Chemistry*, 2003, 41, 2778-2793].

U.S. Pat. No. 4,595,746, and Udipi et al [*Polymer*, 1997, 38(4), 927-938], describe the polymerization of caprolactam using various activating systems. However, this method is characterized by the disadvantage that, in the effort to polymerize caprolactam and a second monomer in chain growth fashion, the reactive group is continually transferred from the polymer chain end to a monomer.

Previous efforts were made to prepare block copolymers using post polymerization modification strategies. For example, Bouma, supra, modified PET and poly(butylene terephthalate) ("PBT") with 0.1-1 mol % diamide units in an extrusion process in order to facilitate polyester crystallization. In addition, Ahn et al [*Polymer*, 1993, 34(10), 4156-4165] prepared polyarylate-nylon 6 block copolymers by anionic polymerization. Dihydroxy-terminated polyarylate was reacted with toluene diisocyanate, and the reaction product was in turn dissolved in and reacted with molten ε-caprolactam. When melt blended with nylon 6 and polyarylates, the block copolymer enhanced the partial miscibility of the two homopolymers. While this approach was successful in preparing block polymers containing nylon 6, the large number of post-polymerization modifications limited the commercial utility of this process.

There thus remains a need for a straightforward, industrially-viable process to prepare polyamide block copolymers.

SUMMARY

In one embodiment, there is provided in this invention a process for preparing a polyamide block copolymer by the sequential steps of:

1. contacting at least one cyclic amide that has a melting point lower than about 260° C. with either catalyst (A) or catalyst (B), wherein catalyst (A) is any one or more of the N-heterocyclic carbene-containing compounds described generally by the Formulae I, II and III:

(I)

(II)

(III)

wherein:

$R_1$, $R_5$, $R_9$ and $R_{11}$ are each independently an adamantyl, alkaryl or alkyl group;

$R_2$, $R_3$, $R_6$, $R_7$ and $R_{10}$ are each independently hydrogen or a $C_{1-12}$ alkyl group;

n=1 or 2;

$R_4$ is the same as $R_1$ when n=1, and is an alkylene group when n=2;

$R_8$ is the same as $R_5$ when n=1, and is an alkylene group when n=2; and catalyst (B) is a mixture or an adduct of catalyst (A) and any one or more of the compounds described generally by the Formulae IV, V, VI and VII:

(IV)

(V)

(VI)

(VII)

wherein $R_{12}$, $R_{13}$, $R_{14}$ and $R_{15}$ are each independently a $C_{1-12}$ aliphatic hydrocarbyl or substituted aliphatic hydrocarbyl group; and $R_{16}$, $R_{17}$, $R_{18}$, $R_{19}$ and $R_{20}$ are each independently a $C_{1-12}$ alkyl group;

2. heating a cyclic amide with catalyst (A) or (B) at or above the melting point of the cyclic amide for a time sufficient to polymerize the cyclic amide to produce a linear polyamide;

3. optionally, cooling the product of step 2;

4. contacting a second monomer with the product of step 2 or 3; and 5. heating the second monomer with the product of step 2 or 3 at or above the melting point of the second monomer for a time sufficient to produce a linear copolymer of a cyclic amide and the second monomer.

Another embodiment of this invention provides novel block copolymers characterized by a percent randomization of less than about 50%; compositions of those block copolymers; and articles and coatings prepared from those block copolymers and the compositions thereof. The novel block copolymers may be prepared by the process of this invention.

A further embodiment of this invention provides an analytical method for determining the degree of randomness in a block copolymer.

This invention enables the preparation of polyamide block copolymers via sequential monomer addition. Useful in a process operated to accomplish such purpose is a polymerization catalyst capable polymerizing not only cyclic amides, but other monomers such as cyclic esters and epoxides as well. While previous efforts were made to prepare block copolymers using post polymerization modification strategies, the process provide herein enables the preparation of block copolymers using sequential addition of monomers.

This type of approach is commercially used in industries that commonly practice anionic polymerization. Currently, these industries are limited to diene and styrene based monomer systems. This process provided herein enables the range of potential block copolymers that can be prepared to be broadened to include commercial step-growth systems and epoxide-based polymers.

The block copolymers provided herein can be utilized as impact modifiers, compatibilizers, and rheology modifiers. They can be used for such purpose in systems that involve other industrially important polymers such as nylon 6, and also as compatibilizers for a range of blends containing nylon and other polymer systems, such as polyesters and poly(vinyl chloride).

DETAILED DESCRIPTION

In the description of this invention, the following definitional structure is provided for certain terminology as employed in various locations in the specification:

"Adamantyl" refers to the radical formed by the loss of a hydrogen atom from adamantane ($C_{10}H_{16}$). The 2-isomer is shown below:

An "adduct" refers specifically to a coordination compound XY formed from a compound X that donates an electron pair to a metal center in compound Y.

"Aliphatic hydrocarbyl" refers to a fully saturated univalent radical containing only carbon and hydrogen.

"Alkyl" refers to a univalent group derived from an alkane by removing a hydrogen atom from any carbon atom: $—C_nH_{2n+1}$ where $n \geq 1$.

An "alkylene group" is $—C_nH_{2n}—$ where $n \geq 1$.

"Aralkyl" refers to an alkyl group which bears an aryl group. One such example is the benzyl group, i.e. the $C_6H_5CH_2—$ radical.

"Aryl" refers to a univalent group whose free valence is to a carbon atom of an aromatic ring. The aryl moiety may contain one or more aromatic ring and may be substituted by inert groups, i.e. groups whose presence does not interfere with the operation of the polymerization catalyst system.

A "cyclic amide" is a cyclic molecule having at least one ring in its molecular structure containing at least one identifiable amide functional repeat unit. The amide functional unit is typically —NH—C(O)— but N-substitution is also possible with, for example, a $C_{1-12}$ alkyl group.

A "divalent aromatic group" is an aromatic group with links to other parts of the macrocyclic molecule. For example, a divalent aromatic group may include a meta- or para-linked monocyclic aromatic group. Examples are the meta- and para-phenylene groups, as follows:

m-phenylene    p-phenylene

A "macrocyclic" molecule is a cyclic molecule having at least one ring within its molecular structure that contains 8 or more atoms covalently connected to form the ring.

A "macrocyclic polyester oligomer" is a macrocyclic oligomer containing 2 or more identifiable ester functional repeat units of the same or different formula. A macrocyclic polyester oligomer typically includes multiple molecules of one specific formula having varying ring sizes. However, a macrocyclic polyester oligomer may also include multiple molecules of different formulae having varying numbers of the same or different structural repeat units. A macrocyclic polyester oligomer may be a co-oligoester, or a multi-oligoester, i.e. a polyester oligomer having two or more different structural repeat units having an ester functionality within one cyclic molecule.

"Mesityl" refers to the radical formed by the loss of a ring hydrogen from 1,3,5-trimethylbenzene; that is, 2,4,6,—$(CH_3)_3C_6H_2$—, as shown below A "mixture" is a physical combination of at least two substances, which may or may not react with each other.

An "N-heterocyclic carbene" is a closed ring system containing at least one nitrogen ring atom and a ring atom that is a divalent carbon.

A "polyamide block copolymer" is a copolymer characterized by the presence in the polymer chain of one or more blocks prepared from monomers, such as cyclic amides, that form the amide linkage [—C(O)N=], and one or more blocks prepared by the polymerization of at least one other monomer.

An "oligomer" is a molecule that contains 2 or more identifiable structural repeat units of the same or different formula.

"Substituted aliphatic hydrocarbyl" refers to an aliphatic hydrocarbyl group that contains one or more types of substituents that do not interfere with the operation of the polymerization catalyst system.

It has been found that N-heterocyclic carbene compounds, or a mixture or adduct of one or more N-heterocyclic carbene compounds with a metal amide or metal alkoxide, are effective catalysts in the production of a polyamide block copolymer in a process of sequential monomer addition in which a first monomer selected from one or more cyclic amides is polymerized to form a polyamide, followed by addition to the reaction mixture of a second monomer, such as one or more of those described below. Such catalysts are stable at the temperatures required for polymerization and result in high monomer conversion, high molecular weight, and a mechanically sound material.

Cyclic amides that may be employed herein to form the amide block(s) of a polyamide block copolymer may be aliphatic, or may include one or more divalent aromatic groups, and generally have a melting point of less than about 260° C.

Aliphatic cyclic amides suitable for use herein include without limitation those described as follows:

Caprolactam

Lactam-12

X = 1: nylon 66 unimer.
X = 2: nylon 66 dimer

Examples of cyclic amides containing at least one aromatic ring suitable for use herein include the following:

Tm = 208° C.

x Tm,° C.
2 178
4 171
6 224

Tm = 245° C.

Tm = 208° C.

Cyclic amides may be obtained through extraction from linear polyamides such as nylon 6 and nylon 66 with, for example, ethanol; and analyzed by gas chromatography [see, e.g., Mori et al, *Analytical Chemistry* (1970), 42(6), 661-662].

It is possible to use different cyclic amides as the monomers in the sequential polymerization steps of the process of this invention, which produces a polymer that is wholly polyamide in character, but which is characterized by blocks polymerized from the different kinds of cyclic amide monomers. That is, in addition to a copolymer prepared from one or more cyclic amides and one or more other kinds of monomers, the block copolymers provided by this invention include copolymers prepared from cyclic co-amides or a mixture of at least two different cyclic amides to produce a block copolyamide. Therefore, unless otherwise stated, references herein to a polymer, composition or article being or containing a polyamide block copolymer include block copolymers prepared from different kinds of cyclic amides in addition to block copolymers prepared from one or more cyclic amides and one or more other kinds of monomers such as an ester or epoxide monomer.

In the process of this invention, materials suitable for use as the follow-on (typically second) monomer include those that are capable of reacting with the living chain end of a linear polyamide as formed in the first phase of the process, and that melt below about 260° C. Examples include without limitation the following: macrocyclic polyester oligomers; epoxides (such as ethylene oxide, propylene oxide, cyclohexene oxide, hexafluoroisobutylene oxide); macrocyclic oligomers of polycarbonate; and lactones such as ε-caprolactone. Preferred macrocyclic polyester oligomers include macrocyclic polyester oligomers of 1,4-butylene terephthalate (CBT); 1,3-propylene terephthalate (CPT); ethylene terephthalate (CET); the cyclic ester dimer of terephthalic acid and diethylene glycol (CPEOT); and macrocyclic co-oligoesters comprising two or more of the above structural repeat units. Macrocyclic polyester oligomers may be prepared by a variety of methods, including those such as described in U.S. Pat. Nos. 5,039,783; 5,231,161; 5,407,984; 5,668,186; WO 2002/68496; WO 2003/93491; U.S. application Ser. No. 11/270,020; and Lavalette et al, Biomacromolecules, vol. 3, p. 225-228 (2002); each of which is incorporated as a part hereof for all purposes.

In the various embodiments of this invention, catalyst A may be any one or more of the N-heterocyclic carbene-containing compounds described generally by Formula I, as follows:

(I)

wherein:

$R_1$ is an adamantyl, alkaryl or alkyl group;

$R_2$ and $R_3$ are independently hydrogen or a $C_{1-12}$ alkyl group; and n equals 1 or 2.

$R_4$ equals $R_1$ when n equals 1, and is an alkylene group when n equals 2.

Preferred compounds include those in which $R_1$ is adamantyl or mesityl, $R_2$ and $R_3$ are hydrogen, and/or $R_4$=$R_1$. Illustrative examples of such compounds include:

1,3-bis(1-adamantyl)-4,5-dihydroimidazol-2-ylidene

1,3-bis(2,4,6-trimethylphenyl)-4,5-dihydroimidazol-2-ylidene and 1,3-bis(2,6-diisopropylphenyl)-4,5-dihydroimidazol-2-ylidene In other embodiments of this invention, catalyst A may be any one or more of the N-heterocyclic carbene-containing compounds as described generally by the following Formula II:

(II)

wherein $R_5$ is an adamantyl, alkaryl or alkyl group;

$R_6$ and $R_7$ are each independently hydrogen or a $C_{1-12}$ alkyl group; and n equals 1 or 2.

$R_8$ equals $R_5$ when n equals 1, and is an alkylene group when n equals 2.

Preferred compounds include those in which $R_5$ is adamantyl or mesityl, $R_6$ and $R_7$ are hydrogen, and/or $R_8$=$R_5$.

Illustrative examples of such compounds include those as described generally by the following species of Formula (II):

1,3-bis(2,6-diisopropylphenyl)imidazol-2-ylidene 1,3-di-1-adamantyl-imidazole-2-ylidene
and 1,3-bis(2,4,6-trimethylphenyl)imidazol-2-ylidene In yet another embodiment of this invention, catalyst A may be any one or more of the N-heterocyclic carbene-containing compounds as described generally by the following Formula III:

wherein $R_9$ and $R_{11}$ are each independently an adamantyl, alkaryl and/or alkyl group; and $R_{10}$ is hydrogen or a $C_{1-12}$ alkyl group.

Preferred compounds include those in which $R_9=R_{11}=$ adamantyl or mesityl, and/or $R_{10}$ is hydrogen.

Carbenes as described by Formula (III) are discussed further in Cetinkaya et al, *J. Organometallic Chemistry* (1994), 481, 89-95; and Teles et al, *Helvetica Chimica Acta* (1996), 79(1), 61-83.

In the various embodiments of this invention, catalyst (B) may be an adduct or mixture of catalyst A and any one or more of the compounds described generally by the following Formulae IV, V, VI and VII:

In catalyst B, a compound of Formula IV may be any one or more of the compounds described generally by the following formula:

wherein $R_{12}$ and $R_{13}$ are each independently a $C_{1-12}$ aliphatic hydrocarbyl or substituted aliphatic hydrocarbyl group. Preferred compounds include those wherein $R_{12}=R_{13}=$methyl or ethyl.

In catalyst B, a compound of Formula V may be any one or more of the compounds described generally by the following formula:

wherein $R_{14}$ and $R_{15}$ are each independently a $C_{1-12}$ aliphatic hydrocarbyl or substituted aliphatic hydrocarbyl group. Preferred compounds include those wherein $R_{14}=R_{15}=$methyl or ethyl.

In catalyst B, a compound of Formula VI may be any one or more of the compounds described generally by the following formula:

(VI)

wherein $R_{16}$, $R_{17}$ and $R_{18}$ are each independently a $C_{1-12}$ alkyl group. Typically, $R_{16}=R_{17}=R_{18}$. Illustrative examples include the case where $R_{16}=R_{17}=R_{18}=$isopropyl.

In catalyst B, a compound of Formula VII may be any one or more of the compounds described generally by the following formula:

(VII)

wherein $R_{19}$ and $R_{20}$ are each independently a $C_{1-12}$ alkyl group. Typically, $R_{19}=R_{20}$. Illustrative examples include aluminum acetylacetonate, in which $R_{19}=R_{20}=$methyl.

The polymerization reaction to make a polyamide block copolymer as provided herein is typically carried out at an elevated temperature, often in the range of about 180 about to 260° C. Typically, the cyclic amide is heated to above its melting point so it becomes less viscous and can be manipulated more easily in processing. Stirring may be employed under an inert atmosphere. The polymerization reaction may be carried out with or without a solvent. A solvent may be used to dissolve one or more of the reactants and/or to mix the reactants. A solvent may also be used as a medium in which the reactions are carried out. Illustrative solvents that may be used include high-boiling compounds such as o-dichlorobenzene and meta-terphenyl. In a preferred embodiment, no solvent is used in the polymerization reaction.

The total amount of catalyst used is typically in the range of 500 to 10,000 ppm. When catalyst B is used, in which both an N-heterocyclic carbene component and a metal alkoxide and/or metal amide component is present, the ratio of the N-heterocyclic carbene component to the metal alkoxide/metal amide component is preferably about 1:1, but can vary from about 1:4 to about 10:1.

A composition may be formed from a polyamide block copolymer as provided herein and one or more second polymers, which may be selected as one or more members of the group consisting of a polyamide, a polyester, an epoxide, a poly(methyl methacrylate), a poly(ethyl acrylate), a poly(ethyl methacrylate), a poly(vinyl chloride), a polycarbonate, a polystyrene ionomer, and a homopolymer of the second monomer used to produce the polyamide block copolymer.

Block copolymers as provided herein, and compositions thereof, are useful as impact modifiers, compatibilizers, surface energy modifiers, and rheology modifiers. For example, block copolymers prepared from caprolactam and ethylene oxide or propylene oxide can be used as compatibilizers in blends of nylon 6 with poly(methyl methacrylate), poly(ethyl methacrylate), poly(vinyl chloride), and polystyrene ionomers. Block copolymers prepared from caprolactam or CN66 with, for example, CBT, CPT or CPEOT can be used as compatibilizers in blends of polyamides and polyesters. The polyamide block copolymers hereof, such as a polyester/amide, can be fabricated as a coating for application to a surface, which can be accomplished, for example, by the addition thereof to automotive paint and coatings systems to render them tougher and more impact resistant.

Block copolymers as provided herein, and compositions thereof, may also be used to manufacture molded articles of various size and shape by methods such as injection molding. In the manufacture of such articles, one or more of various types of fillers may be included.

A particular filler often is included to achieve a desired purpose or property, and may be present in the resulting polymer product. For example, the purpose of the filler may be to increase the strength of the polymer product. Boron nitride is used as a filler in applications that require high levels of heat conductivity and low levels of electrical conductivity. A filler also may provide weight or bulk to achieve a particular density, or be a substitute for a more expensive material. Illustrative examples of fillers useful for these kinds of purposes include, among others, fumed silica, titanium dioxide, calcium carbonate, chopped fibers, fly ash, glass microspheres, micro-balloons, crushed stone, nanoclay, linear polymers, and monomers.

Filler, when used, is added generally in an amount of between about 0.1 wt % and 70 wt % by weight of the total polymer plus filler, depending on the filler and the purpose for adding the filler. For example, the percentage is preferably between about 25% and about 50% by weight in the case of calcium carbonate, between about 2% and about 5% by weight in the case of nanoclays, and between about 10% and about 50% by weight in the case of glass fiber. When a filler is to be included in a polyamide block copolymer hereof, the polymerization reaction in either the first or subsequent phases, or in all phases, is conducted in the presence of the filler. That is, the monomer to be polymerized in that phase is contacted with the catalyst in the presence of the filler.

Furthermore, in the manufacture of an article, additional components, such as additives, may be added. Illustrative additives include colorants, pigments, magnetic materials, anti-oxidants, UV stabilizers, plasticizers, fire-retardants, lubricants, and mold releases, any one or more of which may be used to prepare a composition with a polymer hereof for a designated purpose.

An analytical method based on nuclear magnetic resonance spectroscopy ("NMR") was developed to determine the blockiness of the copolymers provided herein. This requires the use of quantitative NMR at high enough field strength to resolve the peaks assignable to the various repeat units present. Peak intensities are integrated and the values are used to determine the relative amounts of specific units (dyads, triads) within the polymer chain. This is compared with values expected for a completely random copolymer containing the monomers in question.

The method can be demonstrated by referring to FIG. 1 and the statistical analysis below. FIG. 1a is a $^1$H NMR spectrum showing the assignments for a copolymer synthesized from a mixture of caprolactam and CPEOT as described below in Control A, which is random and thus not an example of this invention. FIG. 1b is a $^1$H NMR spectrum showing the assignments for a copolymer of caprolactam and CPEOT synthesized by sequential addition of monomers, according to a process as provided herein and as described below in Example 1. Peak assignments were made previously based on extensive 2D NMR analysis.

The relative amounts of various species were determined by calculating expected and observed probabilities, using the following definitions:

Y is the mole fraction of diethylene glycol-derived moiety in the polymer chain (diol).

T is the mole fraction of terephthalic acid-derived moiety in the polymer chain (diacid).

L is the mole fraction of caprolactam-derived moiety in the polymer chain (amine).

Polymer end groups are disregarded. We define A as the mole fraction of TY structures present, B as the mole fraction of TL structures present, C as the mole fraction of LL structures present, and D as the mole fraction of LY structures present.

Thus, T = (A + B)/2, Y = (A + D)/2, and L = C + D.

Each diethylene glycol contributes two alcoholic OH groups, each ring-opened caprolactam an amine group and a carboxylic acid group, and each terephthalic acid contributes two carboxylic acid groups. Thus, Moles of carbonyl groups, normalized to $1 = 2T + L$ Moles of amine or alcohol $= L + 2Y$ $2T + L = L + 2Y$, so $T = Y$.

The mole fraction of TY structures is the probability of a T structure times the probability of a Y structure, which is, for a random copolymer, $A = [2T/(2T+L)]*[2Y/(L+2Y)] = 4T*Y = 4T^2$ Similarly, $B = [2T/(2T+L)]*[L/(L+2Y)] = 2T*L$ $C = [L/(2T+L)]*[L/(L+2Y)] = L^2$ $D = [L/(2T+L)]*[2Y/(L+2Y)] = 2L*Y = 2L*T$.

Along the same lines, for a random copolymer, the probability for a triad structure, for example, YTL, is the product of the probabilities of component dyads, YT and TL. Thus, for T-centered triads:

$YTY = 0.5*A*[A/(A+B)]$ $YTL = 0.5*A*[B/(A+B)]$ $LTL = 0.5*B*[B/(A+B)]$ $LTY = 0.5*B*[A/(A+B)]$

For Y-centered triads:

$TYT = 0.5*A*[A/(A+D)]$ $TYL = 0.5*A*[D/(A+D)]$ $LYT = 0.5*D*[A/(A+D)]$ $LYL = 0.5*D*[D/(A+D)]$

For L-centered triads:

$TLL = C*[B/(B+C)]$ $TLY = D*[B/(B+C)]$ $LLY = D*[C/(B+C)]$ $LLL = C*[C/(B+C)]$

The results of these triad calculations must be properly normalized to 1 to give the mole fraction expected for each triad in a random copolymer.

Since YTL and LTY sequences occur as a result of randomization, we can define a degree of randomization in these polymers as:

$(YTL+LTY)_{observed}/(YTL+LTY)_{calculated}$ where "calculated" indicates the value calculated for a totally random structure. The percent randomization is then expressed as $100*(YTL+LTY)_{observed}/(YTL+LTY)_{calculated}$.

Resonances of the spectral structures (excluding those due to unreacted monomer) are integrated and compared with the results of the triad equations for a totally random copolymer. According to this method of analysis, the percent randomization for the copolymer whose NMR spectrum is depicted in FIG. 1a is 70.6% (see Control A and Table 2) and the percent randomization for the copolymer whose NMR spectrum is depicted in FIG. 1b is 14.2% (see Example 1 and Table 1).

This analytical method can be generalized to determine the percent randomization in a polyester/amide copolymer made up of the following: a glycol moiety, a diacid moiety, and either a ring-opened lactam or an amino acid. In that case, the two triads of interest are:

Triad 1: Glycol moiety followed by diacid moiety followed by (amine end of ring-opened lactam or amine end of amino acid) and Triad 2: Diacid moiety followed by glycol moiety followed by (acid end of ring-opened lactam or acid end of amino acid.

Figure 1:
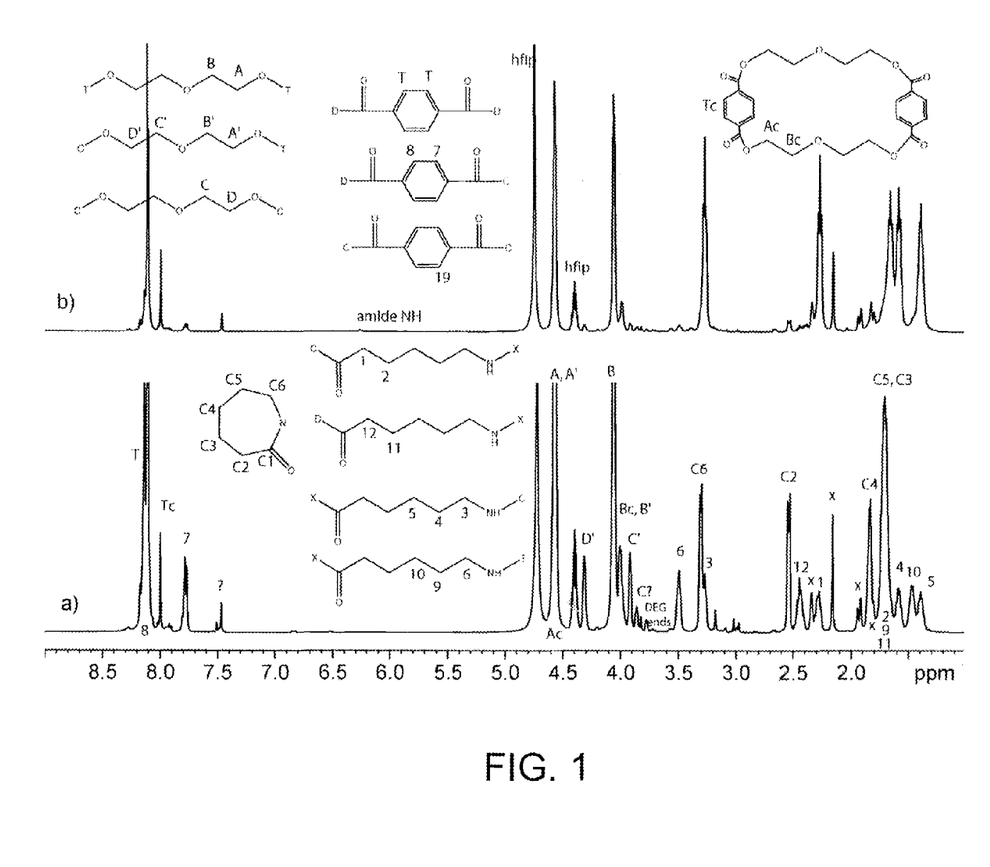
FIG. 1 shows the $^1$H NMR spectra of two copolymers prepared from caprolactam and CPEOT: the copolymer in spectrum (1a), from Control A, is prepared from a mixture of the two monomers; and the copolymer in spectrum (1b), from Example 1, is prepared by sequential monomer addition.

In the case of the copolymer of CPEOT and caprolactam in FIG. 1 analyzed above, Triad 1 corresponds to YTL and Triad 2 corresponds to TYL. The resonances in the NMR spectrum assigned to Triad 1 and Triad 2 are integrated to determine their observed mole fraction. The observed mole fraction is then compared with the mole fraction of each triad expected for a random copolymer:

Triad $1_{random}$=(mole fraction glycol moiety) (mole fraction diacid moiety)(mole fraction lactam or amino acid)=Triad $2_{random}$

The degree of randomness is then

(Triad $1_{observed}$+Triad $2_{observed}$)/(Triad $1_{random}$+Triad $2_{random}$) and the percent randomness is 100 times the degree of randomness.

For polymers containing aromatic species, $^1$H NMR at moderate field strength, e.g., 500 MHz, is adequate to resolve the spectral peaks. However, analysis of all-aliphatic polymers requires the use of $^{13}$C NMR, or possibly significantly higher field strength $^1$H NMR, to obtain adequate resolution of the aliphatic peaks. Again, quantitative NMR must be run such that the peaks being integrated are sufficiently resolved.

Figure 2:
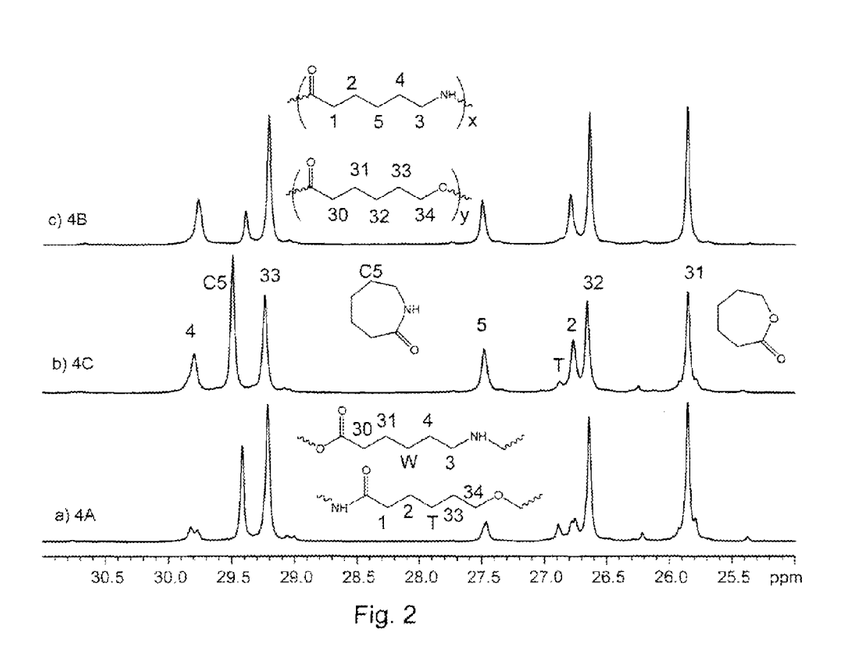
FIG. 2 shows the $^{13}$C NMR spectra of three copolymers of caprolactam and caprolactone of varying degrees of blockiness obtained in Example 3: random a (4A), diblock c (4B) and blocky b (4C).

An example is illustrated in FIG. 2, $^{13}$C NMR spectra of polymers prepared from caprolactone ("CLO") and caprolactam ("CLA") with different degrees of blockiness (see Example 4). In this case, and in general when the copolymer is made from a lactone (or hydroxyacid) and lactam (or amino acid), the determination of degree of randomness becomes a simpler dyad analysis. Peak assignments were made previously based on extensive 2D NMR analysis. Resonances 1 and 30 are integrated to determine the relative mole percent of CLA and CLO, respectively, basing the calculation on the amide or ester bond amount, so as to exclude end group effects. Unreacted CLO and CLA monomers are not included in the calculations. In a completely random copolymer, the probability that a particular dyad will occur is the product of the probabilities of the two monomers of the dyad. The probability of a specific monomer's occurrence is simply its mole fraction. Thus, the mole fractions of the four possible dyads expected for a random copolymer are calculated from the mole fractions of monomers in the polymers:

$$CLOCLA=CLO*CLA$$

$$CLACLO=CLA*CLO$$

$$CLACLA=CLA*CLA$$

$$CLOCLO=CLO*CLO$$

The observed CLACLO is determined from the NMR spectrum by integrating and normalizing Peak W (see FIG. 2). This is compared to the CLACLO mole fraction calculated for a totally random copolymer with those mole fractions of CLA and CLO: The degree of randomization is then the observed fraction of the dyads that are CLACLO divided by the fraction of dyads that are CLACLO that one would expect for a random copolymer of that composition of CLA and CLO, i.e., $$CLACLO_{observed}/CLACLO_{calculated},$$

where "calculated" indicates the value calculated for a totally random structure, and the percent randomization is expressed as $$100*CLACLO_{observed}/CLACLO_{calculated},$$

More generally, for a copolymer made from a lactone (or hydroxyacid) and a lactam (or amino acid), Dyad 1=lactone (or hydroxyacid) followed by lactam (or amino acid) and Dyad 2=lactam (or amino acid) followed by lactone (or hydroxyacid).

The resonances in the NMR spectrum assigned to Dyad 1 and Dyad 2 are integrated to determine their observed mole fraction. The observed mole fraction is then compared with the mole fraction of each dyad expected for a random copolymer:

Dyad $1_{random}$=[mole fraction lactone (or hydroxyacid)][mole fraction lactam (or amino acid)]= Dyad $2_{random}$ The degree of randomness is then (Dyad $1_{observed}$+Dyad $2_{observed}$)/(Dyad $1_{random}$+ Dyad $2_{random}$), and the percent randomness is 100 times the degree of randomness.

The copolymers as provided herein may have a percent randomness less than about 50%, less than about 35%, less than about 20%, less than about 15%, or less than about 10%. The percent randomness of these copolymers may also be described with reference to the mole % of the diads and triads present therein, as determined by the method described above.

EXAMPLES

The advantageous effects of this invention may be seen in a series of examples, as described below. The embodiments of the invention on which these examples are based are illustrative only; they should not be interpreted to indicate that methods, materials and/or conditions other than as described below are not suitable for or equivalent to this invention; and they do not limit the scope of the appended claims. The significance of the examples is better understood by comparing the results obtained from these embodiments of the invention with the results obtained from Control A, which is a copolymer prepared by simultaneously polymerizing the monomers and thus not by a method of this invention. Abbreviations are as Follows:

"min" means minute(s), "h" means hour(s), "sec" means second(s), "µsec" means microsecond(s), "g" means gram(s), "mg" means milligram(s), "mol" means mole(s), "mmol" means millimole(s), "L" means liter(s), "mL" means milliliter(s), "$M_n$" means number average molecular weight, "$M_w$" means weight average molecular weight, "PDI" means polydispersity index, "ppm" means parts per million, "$T_m$" means melting point, "$T_g$" means glass transition temperature, "DSC" mean differential scanning calorimetry, "NMR" means nuclear magnetic resonance spectroscopy, "kHz" means kilohertz, "MHz" means megahertz, and "GPC" means gel permeation chromatography.

Experimental

Materials

Aluminum isopropoxide (CAS# 555-31-7, 98%) was obtained from Strem Chemicals, Inc. (Newburyport, Mass.), and was used as received. Caprolactam (CAS# 105-60-2, 99%) and caprolactone (CAS# 695-06-7) were obtained from Aldrich Chemical Company (Milwaukee, Wis.), and were used as received.

CPEOT was prepared as follows: A 22-L jacketed resin kettle equipped with overhead stirrer and Dean-Stark trap was charged with 9.246 L of toluene, 265.3 grams (2.50 moles) of diethylene glycol, and 485.5 g (2.50 moles) of dimethylterephthalate. The resulting mixture was heated to 80° C. with stirring until the dimethylterephthalate had dissolved, then 300 g of immobilized *Candida antartica* lipase B (Novozyme 435) was added. The resulting mixture was maintained at 80° C. while being sparged with nitrogen at 8.5 L/minute, and toluene lost due to sparging was replaced periodically. After 24 h, the nitrogen sparge was discontinued, and the reaction mixture was discharged from the kettle at 80° C. Toluene was distilled from the product mixture at 70° C. and 50 torr vacuum, the resulting solids (1050 g) were divided into three equal portions, and each portion extracted with 11 L of refluxing chloroform for 3 h. The hot chloroform extract was filtered to remove the enzyme catalyst, and the resulting filtrate concentrated to about 3.5 L, cooled to room temperature, filtered, and the recovered white solid air-dried to produce a total of 490 g (83% yield, 99% purity) of 3,6,9,16,19,22-hexaoxatricyclo[22.2.2.211,14]triaconta-11,13,24,26,27,29-hexaene-2,10,15,23-tetrone, also known as "cyclic poly(diethyleneglycol terephthalate)" or CPEOT.

The N-heterocyclic carbenes were prepared as described in Niehues et al, *J. Organometallic Chem.*, 2002, Vol. 663, pp. 192-203; Herrmann et al, *Chem. Eur. J.*, 1996, p. 1627; and Arduengo et al, *Tetrahedron*, 1999, Vol. 55, pp. 14523-14534.

A 1:1 adduct of aluminum isopropoxide (CAS# 555-31-7) and 1,3-di-1-adamantyl-imidazole-2-ylidene was prepared by adding the carbene 1,3-di-1-adamantyl-imidazole-2-ylidene to the aluminum isopropoxide in toluene and heating until a clear solution resulted. NMR indicated that a 1:1 adduct of the two was formed.

Example 1

A mixture of 45 mg of the 1,3-di-1-adamantyl-imidazole-2-ylidene and 454 mg of caprolactam was heated at 230° C. for 15 minutes. $M_n$ was determined by GPC to be 31,500 (PDI=$M_w$/$M_n$=3.4) with 86% conversion. The sample was cooled to room temperature and 948 mg of CPEOT was added. This mixture was heated at 230° C. for 30 minutes. $M_n$ was determined by GPC analysis to be 24,700 (PDI=$M_w$/$M_n$=3.4) with 83% conversion.

$^1$H NMR spectra were obtained using a 500 MHz Bruker Avance spectrometer (adv302) on a 5 mm IDz probe on 10-20 mg samples diluted in 0.5 mL HFIP-$d_2$ (1,1,1,3,3,3-hexafluoroisopropanol-$d_2$) at 30° C. using a 90 degree pulse of about 8 μsec, a spectral width of 7 kHz, digital filtering, an acquisition time of 4.7 sec and a recycle delay of 30 sec. A total of 16 transients were acquired. Spectra were referenced to HFIP residual methine at 4.395 ppm. The spectrum of the sample is shown in FIG. 1b. The results of triad analysis by NMR are given in Table 1. Percent randomization was calculated using the observed and expected mole percents of YTL and TYL in the same manner as described above. TLX and LLX denote triads where it could be determined what was on one side of the central L but not on the other side. The percent randomization is 100*(2+1.7)/(13.0+13.0)=14.2%

TABLE 1

| Triad | Observed mole % | Expected mole % if random |
|---|---|---|
| YTY | 24.3 | 7.0 |
| YTL | 2.0 | 13.0 |
| LTL | | 6.1 |
| TLX | 2.3 | 24.3 |
| TYT | 23.6 | 7.0 |
| TYL | 1.7 | 13.0 |
| LYL | | 6.1 |
| LLX | 46.0 | 23.5 |

Control A
In this run, both reagents are reacted together instead of sequentially.

45 mg of 1,3-di-1-adamantyl-imidazole-2-ylidene, 454 mg of caprolactam and 948 mg of CPEOT were combined and heated at 230° C. Samples were taken for GPC analysis after 15 minutes and 30 minutes of reaction. $M_n$ of the sample taken after 15 minutes was determined by GPC to be 19,000 (PDI of 1.6) with 78% conversion; $M_n$ of the sample taken after 30 minutes was determined by GPC of the sample to be 17,200 (PDI of 1.7) with 86% conversion.

$^1$H NMR spectra were obtained in the same manner as described in Example 1. The spectrum is shown in FIG. 1a. The results of triad analysis by NMR are given in Table 2. Percent randomization was calculated using the observed and expected mole percents of YTL and TYL in the same manner as described above. The percent randomization is 100*(8.7+9.1)/(12.6+12.6)=70.6%.

TABLE 2

| Triad | Observed mole % | Expected mole % for random |
|---|---|---|
| YTY | 33.5 | 32.3 |
| YTL | 8.7 | 12.6 |
| LTL | | 1.2 |
| TLX | 9.3 | 4.9 |
| TYT | 32.4 | 32.3 |
| TYL | 9.1 | 12.6 |
| LYL | | 1.2 |
| LLX | 7.0 | 2.9 |

Example 2

A mixture of tris-(dimethylamino)alane dimer (17 mg) and 1,3-di-1-adamantyl-imidazole-2-ylidene (17.6 mg) was combined with 1 g of caprolactam and heated at 200° C. for 2 h. At that time, 1 g of CPEOT was added and the mixture was heated at 260° C. for 1 h. GPC analysis of the copolymers indicated $M_n$=18,600 and $M_w$=45,400. The thermal properties of this block copolymer were characterized using DSC analysis. Interestingly, during the first heat, the polymer only exhibited a single glass transition temperature at 21° C. ($T_g$ for PEOT). After annealing the polymer at 110° C. for 30 min, the material appeared to become crystalline. DSC analysis of this material after the annealing process indicated that the polymer exhibited a glass transition temperature associated with the CPEOT domains (21° C.) and a melting endotherm at 212° C. that was associated with the crystalline domains of nylon 6. The amorphous nature of the polymer prior to annealing was attributed the restricted mobility of the nylon 6 block due to the viscosity of the attached CPEOT polymer block. $^1$H NMR spectra were obtained in the same manner as described in Example 1. The results of triad analysis by NMR are given in Table 3. Percent randomization was calculated using the observed and expected mole percents of YTL and TYL. The percent randomization is 100*(0.9+1.0)/(15.6+15.6)=6.1%

TABLE 3

| Triad | Observed mole % | Expected mole % for random |
|---|---|---|
| YTY | 32.3 | 13.1 |
| YTL | 0.9 | 15.6 |
| LTL | | 4.6 |
| TLX | 1.1 | 18.5 |
| TYT | 28.5 | 13.1 |

TABLE 3-continued

| Triad | Observed mole % | Expected mole % for random |
|---|---|---|
| TYL | 1.0 | 15.6 |
| LYL |  | 4.6 |
| LLX | 36.1 | 14.8 |

Example 3

Three caprolactam/caprolactone copolymers were prepared, 4A, 4B and 4C, as described below 4A. Caprolactam (10 g, 0.0885 mol) was heated to 185° C. Caprolactone (5.0 g, 0.043 mol) was added to the molten caprolactam and stirred to form a clear solution. A 1:1 complex of aluminum isopropoxide (CAS# 555-31-7) and 1,3-di-1-adamantyl-imidazole-2-ylidene (390 mg, 1.25 mmol) was stirred into the reaction to initiate the polymerization. The reaction was allowed to proceed for 1 h at 185° C. $M_n$=3,760, PDI=1.42 DSC analysis indicated a $T_m$ at 40° C. (polycaprolactone homopolymer) and one at 50° C. (copolymer of caprolactone and caprolactam).

4B. A preformed initiator adduct was prepared by combining aluminum isopropoxide (CAS # 555-31-7, 0.56 g, 0.00276 mol) and 1,3-di-1-adamantyl-imidazole-2-ylidene (0.92 g, 0.00276 mol) in toluene (5 mL) in a 200 mL reaction kettle. The solution was allowed to stir into solution and then the toluene was removed in vacuo. Caprolactam (CAS# 105-60-2, 100 g) was added to the reaction mixture, and the reactor was heated to 200° C. The polymerization was allowed to proceed for 120 min. Caprolactone (CAS# 502044-3, 100 g) was then added rapidly and the reaction was allowed to proceed for 180 min. GPC analysis of the resulting material indicated $M_n$=19,000 g/mol and PDI=2.4 (Single Peak). DSC analysis indicated a $T_m$ at 217° C. and one at 52° C.

4C. Caprolactam (10 g, 0.0885 mol) was heated to 200° C. A 1:1 complex of aluminum isopropoxide (CAS# 555-31-7) and 1,3-di-1-adamantyl-imidazole-2-ylidene (390 mg, 1.25 mmol) was stirred into the caprolactam to initiate the polymerization. The reaction was allowed to proceed for 25 min at 200° C. The reaction mixture was then transferred to a 190° C. heating source, and caprolactone (5.0 g, 0.043 mol) was added to the molten reaction mixture and stirred to form a clear solution. The reaction was then allowed to proceed for 30 min.

$^{13}$C NMR spectra were obtained of each of the three copolymers on a 500 MHz Varian Inova spectrometer (v500269) on a 10 mm BB probe on 480-620 mg samples diluted in mL HFIP-$d_2$ (1,1,1,3,3,3-hexafluoroisopropanol-$d_2$) to give a total volume of 3.1 mL. 60 mg of chromium acetylacetonate was also added to each sample. Samples were run at 30° C. using a 90 degree pulse of about 16 µsec, a spectral width of 31 kHz, digital filtering, inverse gated decoupling, an acquisition time of 0.64 sec and a recycle delay of 5 sec. A total of 2540 transients were acquired. Spectra were referenced to HFIP $CF_3$-$d_2$ at 122.123 ppm; a secondary reference of peak 31 at 25.85 ppm was for some spectra. 2D NMR spectra were obtained using appropriate parameters on a Bruker 500 MHz NMR with a BBI probe. The spectra are shown in FIG. 2. The results of dyad analysis by NMR are given in Table 4.

TABLE 4

| Description | 4A Random | 4B Diblock | 4C Blocky |
|---|---|---|---|
| CLA mol % | 16.2 | 31.3 | 37.8 |
| CLO mol % | 83.8 | 68.7 | 62.2 |
| Observed CLACLO dyad mol % | 10.4 | 3.2 | 6.8 |
| Expected CLACLO dyad mol % for random copolymer | 13.6 | 21.5 | 23.5 |
| Percent randomization, | 77 | 15 | 29 |

What is claimed is:

1. A polyamide block copolymer having a percent randomization less than about 50%, which comprises (a) one or more blocks prepared from a monomer that forms an amide linkage, and (b) one or more blocks prepared from a member of the group consisting of a macrocyclic polyester oligomer, a lactone, an epoxide, and a macrocyclic oligomer of polycarbonate.

2. The polyamide block copolymer of claim 1 wherein the percent randomization is less than about 10%.

3. The polyamide block copolymer of claim 1 which comprises one or more blocks prepared from a macrocyclic polyester oligomer.

4. The polyamide block copolymer of claim 1 which comprises one or more blocks prepared from a lactone.

5. The polyamide block copolymer of claim 1 which comprises one or more blocks prepared from an epoxide.

6. The polyamide block copolymer of claim 1 which comprises one or more blocks prepared from a macrocyclic oligomer of polycarbonate.

7. A composition of matter comprising the polyamide block copolymer of claim 1 and one or more second polymers.

8. The composition of claim 7 fabricated as a molded article or a coating on a surface.

9. The polyamide block copolymer of claim 1 wherein a monomer (a) comprises a cyclic amide.

10. The polyamide block copolymer of claim 1 wherein a macrocyclic polyester oligomer is selected from the group consisting of macrocyclic polyester oligomers of 1,4-butylene terephthalate (CBT); 1,3-propylene terephthalate (CPT); ethylene terephthalate (CET); the cyclic ester dimer of terephthalic acid and diethylene glycol (CPEOT); and macrocyclic co-oligoesters comprising two or more of the foregoing structural repeat units.

11. The composition of claim 7 wherein a second polymer comprises one or more members of the group consisting of a polyamide, a polyester, an epoxide, a poly(methyl methacrylate), a poly(ethyl acrylate), a poly(ethyl methacrylate), a poly(vinyl chloride), a polycarbonate, a polystyrene ionomer, and a homopolymer of a group member (b).

12. The polyamide block copolymer of claim 1 fabricated as a molded article or a coating on a surface.

* * * * *